(12) United States Patent
Bjerrehorn

(10) Patent No.: US 10,641,397 B2
(45) Date of Patent: May 5, 2020

(54) VALVE SEAT

(71) Applicant: STACCATO TECHNOLOGIES AB, Mölndal (SE)

(72) Inventor: Fredrik Arnold Bjerrehorn, Handen (SE)

(73) Assignee: STACCATO TECHNOLOGIES AB, Mölndal (SE)

(\*) Notice: Subject to any disclaimer, the term of this patent is extended or adjusted under 35 U.S.C. 154(b) by 104 days.

(21) Appl. No.: 15/566,007

(22) PCT Filed: Mar. 23, 2016

(86) PCT No.: PCT/SE2016/000013
§ 371 (c)(1),
(2) Date: Oct. 12, 2017

(87) PCT Pub. No.: WO2016/167699
PCT Pub. Date: Oct. 20, 2016

(65) Prior Publication Data
US 2018/0128382 A1    May 10, 2018

(30) Foreign Application Priority Data

Apr. 14, 2015   (SE) ...................................... 1500180

(51) Int. Cl.
*F16K 1/42* (2006.01)
*F16K 31/06* (2006.01)
(Continued)

(52) U.S. Cl.
CPC ................ *F16K 1/42* (2013.01); *F16K 1/422* (2013.01); *F16K 1/44* (2013.01); *F16K 31/0658* (2013.01); *F16K 31/0675* (2013.01); *F16K 31/12* (2013.01)

(58) Field of Classification Search
CPC ... F16K 1/42; F16K 1/422; F16K 1/44; F16K 31/0658; F16K 31/0675; F16K 31/12
See application file for complete search history.

(56) References Cited

U.S. PATENT DOCUMENTS 289,954 A  * 12/1883  Badger ..................... F16K 1/44
                                                      137/625.35
3,262,027 A  *  7/1966  Zaleske ............... F16K 31/0675
                                                     251/129.15
(Continued)

FOREIGN PATENT DOCUMENTS

CN      103 016 783      4/2013
DE      25 56 308        6/1977
(Continued)

OTHER PUBLICATIONS

International Search Report for PCT/SE2016/000013 dated May 17, 2016, 5 pages.
(Continued)

*Primary Examiner* — Matthew W Jellett
*Assistant Examiner* — Christopher D Ballman
(74) *Attorney, Agent, or Firm* — Nixon & Vanderhye P.C.

(57) ABSTRACT

A valve with a valve seat includes an inner path providing a first flow channel adapted to be in contact with a first chamber of the valve, the valve seat including at least one outer path also adapted to be in contact with the first chamber, the valve seat further including an area facing a sealing area of the valve, the area being adapted to be in connection with a second chamber, the area having an inner sealing edge and an outer sealing edge, and wherein the valve seat is adapted to allow for a flow between the first chamber and the second chamber when the valve is in an open position, where the flow in the inner path and the at least one outer path flow through the area in contact with the (Continued)

second chamber via the inner sealing edge and the outer sealing edge, respectively.

11 Claims, 5 Drawing Sheets

(51) Int. Cl.
*F16K 1/44* (2006.01)
*F16K 31/12* (2006.01)

(56) References Cited

U.S. PATENT DOCUMENTS

| | | | | |
|---|---|---|---|---|
| 4,269,227 | A * | 5/1981 | Araki | F16K 1/44 137/630.14 |
| 4,726,390 | A * | 2/1988 | Franklin | E03C 1/104 137/218 |
| 5,390,703 | A * | 2/1995 | Tengesdal | F16K 1/44 137/629 |
| 5,507,436 | A * | 4/1996 | Ruttenberg | B05B 1/086 137/624.14 |
| 5,551,483 | A * | 9/1996 | Hochstrasser | E03C 1/104 137/846 |
| 5,582,208 | A | 12/1996 | Suzuki | |
| 6,612,338 | B2 * | 9/2003 | Weldon | F16K 1/44 137/529 |
| 6,871,803 | B1 | 3/2005 | Ohmi et al. | |
| 7,717,130 | B2 * | 5/2010 | Batdorff | F16K 11/0716 137/625.33 |
| 10,161,395 | B2 * | 12/2018 | Vadasz | F16K 1/36 |
| 2002/0088441 | A1 * | 7/2002 | Weldon | F02M 25/0836 123/520 |
| 2006/0118752 | A1 | 6/2006 | Tin-Kai et al. | |
| 2010/0138051 | A1 | 6/2010 | Glime et al. | |
| 2012/0267554 | A1 | 10/2012 | Heyer et al. | |
| 2013/0205986 | A1 | 8/2013 | Rampen et al. | |
| 2013/0295479 | A1 | 11/2013 | Barter et al. | |
| 2014/0123964 | A1 * | 5/2014 | Hatano | F16K 1/44 123/568.11 |

FOREIGN PATENT DOCUMENTS

| | | |
|---|---|---|
| DE | 10 2011 055093 | 5/2013 |
| EP | 2 623 827 | 8/2013 |
| JP | S61-152852 | 7/1986 |
| JP | H2-116071 | 9/1990 |
| JP | 2005-351453 | 12/2005 |
| WO | WO 2015/020706 | 2/2015 |

OTHER PUBLICATIONS

Written Opinion of the ISA for PCT/SE2016/000013 dated May 17, 2016, 5 pages.

* cited by examiner

VALVE SEAT

This application is the U.S. national phase of International Application No. PCT/SE2016/000013 filed Mar. 23, 2016 which designated the U.S. and claims priority to SE Patent Application No. 1500180-3 filed Apr. 14, 2015, the entire contents of each of which are hereby incorporated by reference.

TECHNICAL FIELD

The present disclosure relates to a valve seat. The present disclosure also relates to a valve.

BACKGROUND

A valve seat can be described as a surface on which a valve rests or a surface against which it presses. The valve seat can be formed as an individual component or it can be integral with other parts of a valve arrangement.

Valve seats can be formed in many different ways depending on the application in which it is to be used.

There is a constant desire to improve the operation of valves. Hence, there exists a need for an improved valve seat and also to a valve with a valve seat.

SUMMARY

It is an object of the present invention to provide an improved valve seat.

This object and/or others are, at least partly, obtained by the valve seat and valve as set out in the appended claims.

As has been realized by the inventor conventional valve seats don't allow the valves to use their full stroke with full efficiency. This is, at least partly, because the geometry of a conventional valve seat typically is not optimized for the interaction in the nozzle area of the valve seat and the stroke length which forces the valve stroke to be longer than necessary. A general disadvantage experienced by a valve with a longer stroke is a longer opening time and a higher exposure to wear. In an electromechanical valve, the operating force is also considerably less for long strokes when operating the valve at its endpoint due to decreased magnetic force at longer distances.

An object of the invention is hence to overcome or at least reduce the disadvantages with today's valve seats and to provide a valve and a valve seat that allows for a shorter valve stroke. This is obtained by an orifice geometry in the valve seat designed to allow a shorter stroke with a preserved or increased flow capacity. Also, at the same time, the counter force from the working medium can be preserved or even decreased.

In accordance with one embodiment, a valve seat for use in a valve is provided. The valve seat has an inner path that can be formed as an orifice providing a first flow channel. The inner path is adapted to be in contact with a first chamber that can be the inlet of the valve. The valve seat also comprises at least one outer path also adapted to be in contact with the first chamber. The valve seat further comprises an area, a sealing area, facing a sealing of the valve. The sealing area is adapted to be in connection with a second chamber that can be the outlet from the valve. The sealing area has an inner sealing edge and an outer sealing edge. The valve seat is adapted to allow for a flow of a working medium between the first chamber and the second chamber when the valve is in an open position. The flow path in the open position in the inner path and the outer path flow through the sealing area being in contact with the second chamber via the inner sealing edge and the outer sealing edge, respectively. Hence, the flow through the valve enters (or exits) the sealing area of the valve from two different direction, via an inner sealing edge and via an outer sealing edge. This provides for a total perimeter of the sealing area that is increased in comparison with a conventional valve seat having a sealing area with only one perimeter. The increased perimeter can reduce the stroke length required for the plunger operating in the valve, which is advantageous.

In accordance with one embodiment the sealing area is the top area of a recess formed in the valve seat.

In accordance with one embodiment the inner sealing edge is round. Also, the outer sealing edge can in some embodiments also be round. The sealing inner and outer sealing edges can be located in the same plane.

In accordance with one embodiment at least two outer paths are provided.

In accordance with one embodiment the inner path is fed via at least two supply channels.

In accordance with one embodiment the valve can be an electromagnetic valve. The valve can be adapted to use air as working medium.

By providing such a valve with a valve seat having a sealing area with an inner and outer sealing edge, the total perimeter of the sealing area sealed by the sealing surface of the plunger in the valve will then be increased for a comparative size of the valve/valve seat. As has been realized, an increased perimeter of the area sealed allows for a shorter stroke of the plunger with a preserved flow area between valve seat edges and the movable sealing surface of the valve. The shorter stroke will provide the advantage that a shorter opening time can be achieved. Also the wear is reduced. In an electromechanical valve, the operating force is also considerably increased, in particular at the end point of operation.

BRIEF DESCRIPTION OF THE DRAWINGS

The present invention will now be described in more detail by way of non-limiting examples and with reference to the accompanying drawings, in which.

DETAILED DESCRIPTION

Figure 3:
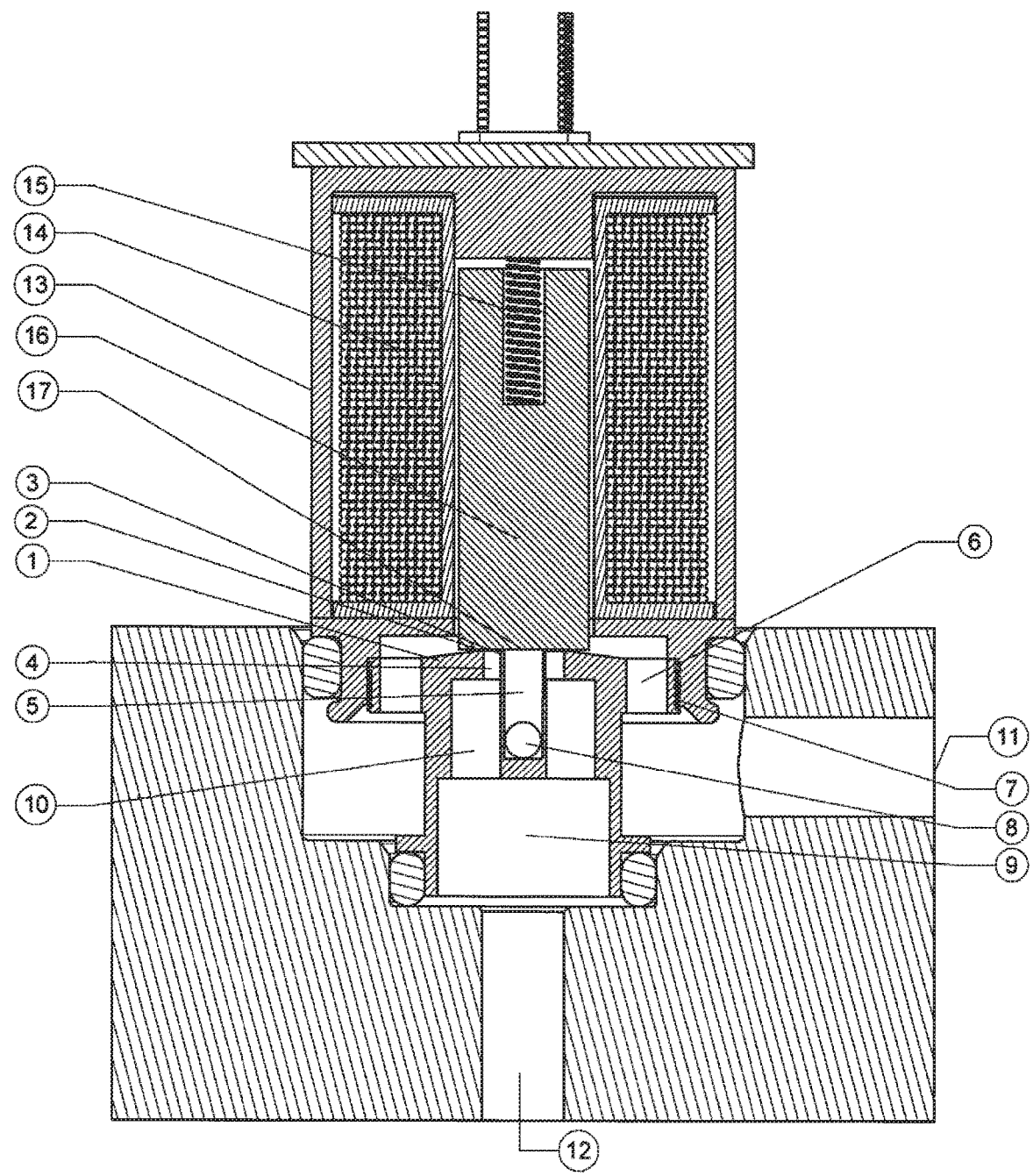
FIG. 3 is an axial section view of a valve seat provided in a normally closed electromechanical valve when in its closed position.
Figure 4:
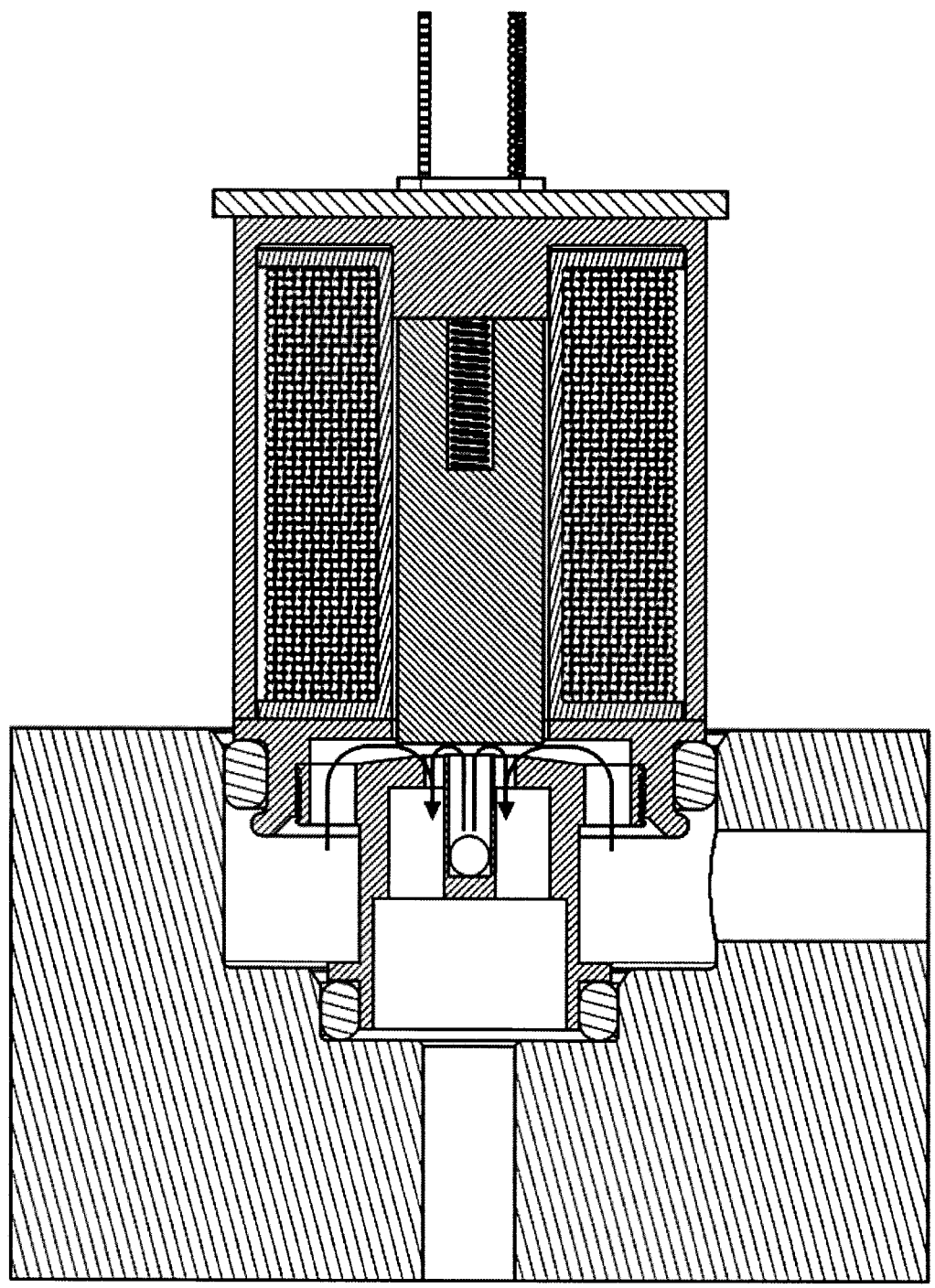
FIG. 4 is an axial section view of a valve seat in a normally closed electromechanical valve in its open position.

In the below description the valve in which the valve seat is present can be an electromechanical valve as depicted in FIGS. 3 and 4. However, the principles described herein are not limited to such a valve, but the valve seat can be used in any type of valve.

Figure 1:
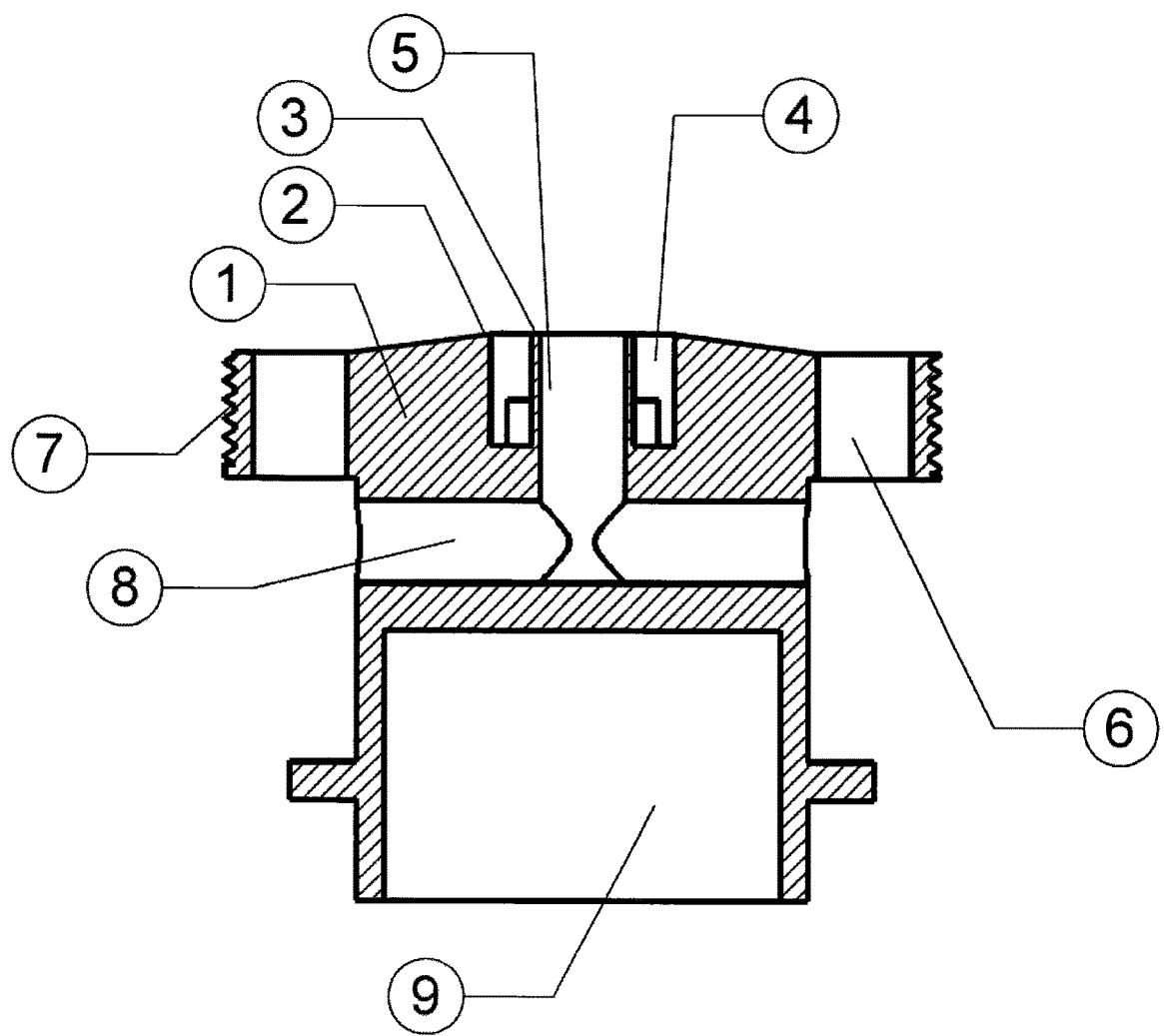
FIG. 1 is an axial section view of a valve seat.

In FIG. 1 an exemplary valve seat 1 for use in a valve is depicted in an axial sectional view. In some embodiments, the valve seat comprises a recess 4 having an inner sealing edge 3 and an outer sealing edge 2. In accordance with one embodiment the inner and outer sealing edges 2 and 3 are located in the same plane. The sealing edges 2, 3 can in accordance with one embodiment have an essentially round shape.

Inside the inner sealing edge 3 an inner path 5 is in direct communication with an inlet chamber 11 of the valve (see FIG. 3) through a supply channel 8. Outside the outer sealing edge 2 an outer path 6 is also connected to the inlet chamber 11 (see FIG. 3) of the valve. Both the inner path 5 and the outer path 6 will thus be connected to a working medium of the valve. The pressure at the outer path 6 and the inner path 5 will be the same since the inner path 5 and the outer path 6 are both in contact with the inlet chamber 11. Further, the recess 4 in the valve seat 1 is connected to a valve outlet chamber 12 via paths 9 and 10, (see FIG. 3).

Figure 2:
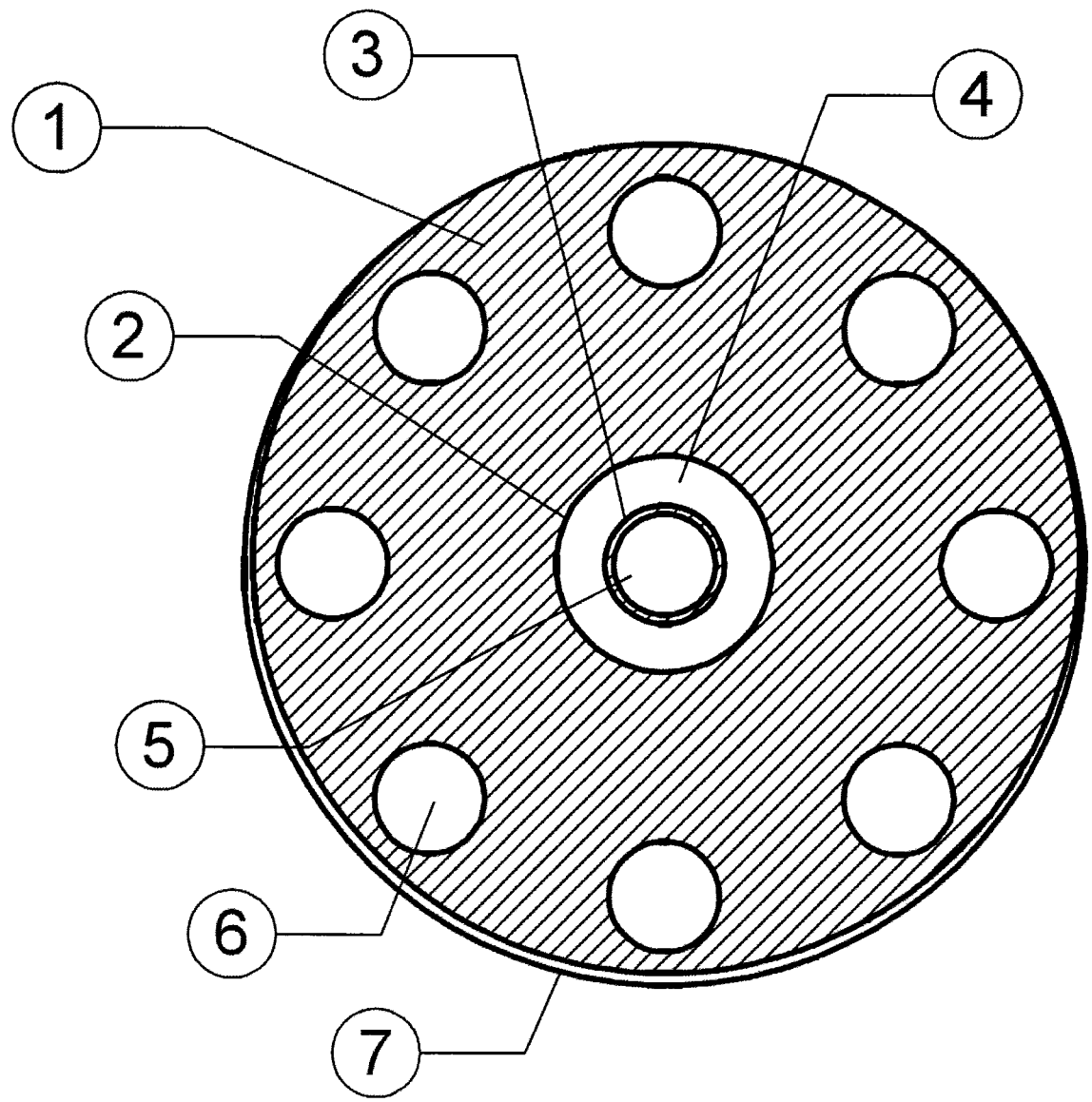
FIG. 2 is a radial section view of a valve seat.

In FIG. 2, the valve seat of FIG. 1 is depicted in a radial sectional view. As can be seen in FIG. 2, a number of outer paths 6 can be provided in the valve seat 1. Each of the outer paths 6 is connected to the valve inlet. The number of outer paths 6 can be any suitable number, such as any number between 1 and 20. In some embodiments only one outer path 6 is provided. In accordance with some embodiments there are at least two outer paths 6 provided and in the embodiment of FIG. 2 there are eight outer paths 6 provided and even more can be provided.

In FIG. 3, an axial sectional view of a valve comprising a valve seat 1 in accordance with FIGS. 1 and 2 is depicted. The valve of FIG. 3 is a normally closed electromechanical valve when in its closed position.

In the exemplary valve embodiment depicted in FIG. 3, the valve comprises a spring 15 cooperating with a plunger 16. The spring loaded plunger 16 is provided with an end section having a sealing area 17 for cooperation with and to come in contact with the sealing edges 3 and 2 and will separate the inlet side of the valve 11, 6, 8, 5 from the outlet side of the valve 4, 9, 10, 12. This is obtained by the sealing area 17 of the contacting end of the plunger 16 closing the opening of the recess 4 facing the plunger 16. In this example, the valve is normally closed, i.e. the valve is in a closed position when no action is taken to lift the plunger from its position resting against the valve seat. By moving the plunger 16 with an electromagnetic force by providing current in a coil 14, the plunger 16 which separates the plunger sealing area 17 and the valve seat is lifted and a flow channel is opened in the valve whereby the working media in the valve is allowed to flow through the valve. The valve is then in an open position. The open position is depicted in FIG. 4 and the working media can here flow through the valve. Thus, the contact force forcing the sealing area 17 towards the valve seat 1 is removed and there is no longer a seal between the plunger 16 and the valve seat 1. Hence, the working medium can now flow from an inlet chamber to an outlet chamber of the valve when the valve is open. In this example, the medium flow direction is assumed to be from inlet chamber 11 to the outlet chamber 12 but it is also envisaged that the flow direction can be in the opposite direction. Hence, the flow can equally well be changed to the opposite direction from outlet chamber 12 to the inlet chamber 11.

The mechanical attachment of the valve seat 1 to a valve body 13 of the valve can be in any suitable way that fits a particular application. In this exemplary embodiment, the valve seat 1 is mounted to the valve body 13 by threads 7 formed on the side of the valve seat 1.

Figure 5:
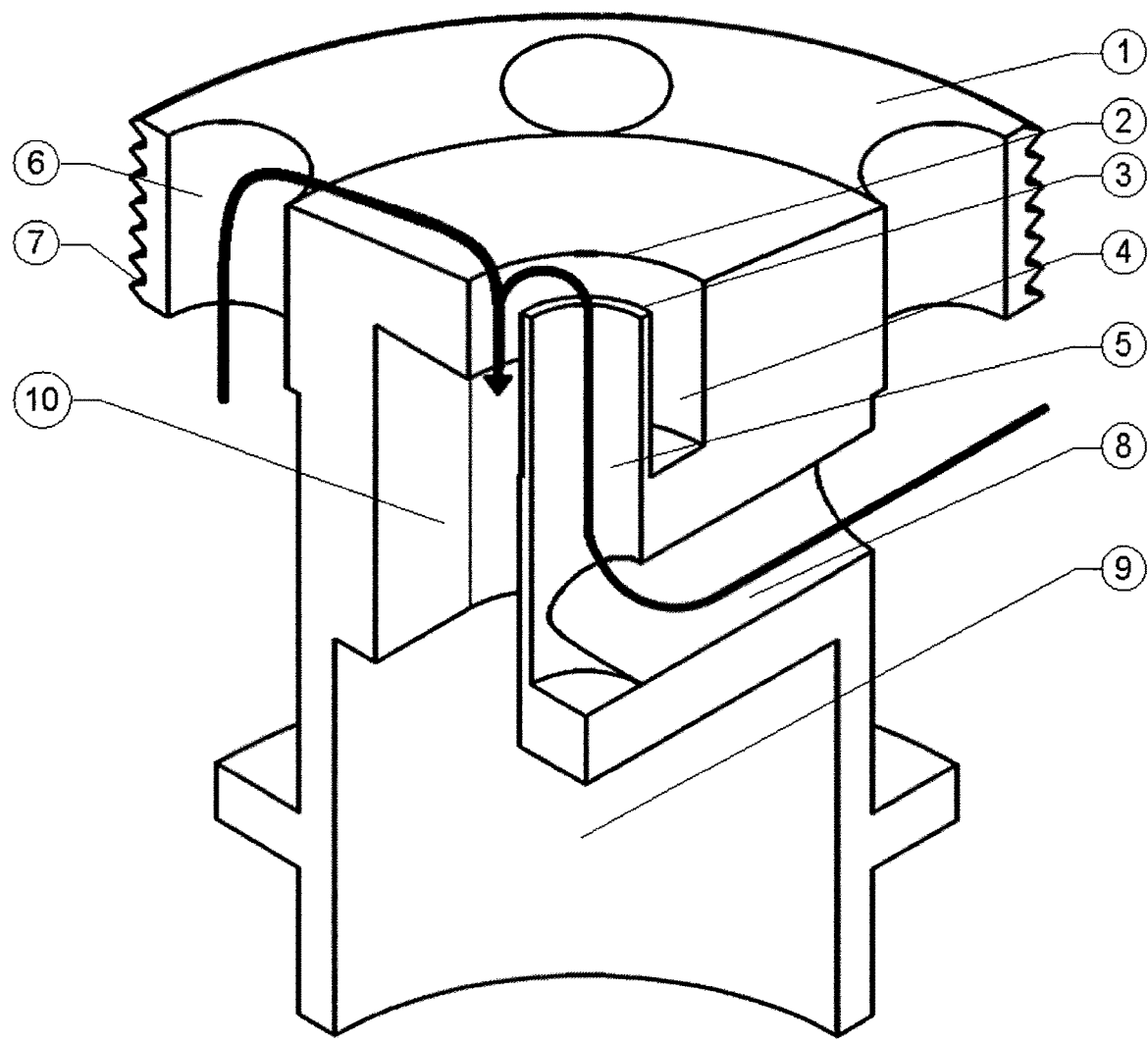
FIG. 5 is a cross-sectional view from the side of a valve seat.

In FIG. 5, the flow from the inlet chamber via outer paths, here the outer paths 6, and an inner path here, the inner path 5, and out via the recess 4 to the outlet chamber is depicted. Thus, as indicated by the arrows in FIG. 5, a flow can enter the sealing area of the recess 4 from two different sealing edges 2 and 3. One flow is via an inlet path, here a horizontal supply channel 8, directing a flow from the valve inlet to an orifice, here a vertical inner path 5 centrally located in the valve seat 1. In some embodiment many supply channels 8 are provided extending between the valve inlet and the orifice. In some embodiments at least two inlet paths are provided. Here four supply channel 8 are provided. The flow from the central orifice enters the sealing area of the recess 4 via the inner sealing edge 3 when the valve is in an open position and the seal is removed. At the same time a flow also enters the recess 4 via the outer sealing edge 2 via the outer paths 6 that are also connected to the valve inlet. The flow entering the recess 4 via the inner and outer sealing edges on the valve seat 1 exits the valve seat to a valve outlet via a path 10 connected to the recess 4 which leads the flow vertically to a path 9 connected to the valve outlet.

As set out above, the valve seat 1 described herein can comprise an inner path 5 the perimeter of which forms an inner sealing edge 3. By letting the working media flow to the outlet via an outlet area in the sealing surface of the valve seat that has both an inner and an outer perimeter, it will be possible to increase the total perimeter of the outlet area in the sealing surface facing the sealing area 17 of the valve. Such an arrangement with an increased perimeter of the outlet area being in contact with the sealing area 17 of the plunger will improve the working of the valve.

Thus, in accordance with embodiments described herein the perimeter of the outlet area adapted to be sealed by the sealing of the valve, here the sealing area 17 of the plunger 16, is increased in that the outlet area has both an inner and an outer perimeter. The outlet area can for example be ring-shaped as in the example described above and depicted in FIG. 2, but other shapes are possible as long as there is both an inner and outer perimeter of the outlet area. The perimeters can be in the same plane but can also be in different planes. This will depend on the geometry of the sealing area provided to seal the inlet of the valve from the outlet of the valve. In this example the sealing area 17 is generally flat, and the perimeters, i.e. the sealing edges 2 and 3 in this example, are then located in the same plane. Thus, the contact area between the sealing area 17 of a plunger 16 and the sealing edges 2, 3 can be but do not have to be flat. The perimeter of the outlet area, for example a recess 4 as in this example, thus consists of both an outer sealing edge 2 and an inner sealing edge 3. Compared to a conventional valve seat, the total perimeter of the outlet area in contact with the sealing surface of the plunger in the valve will then be increased for a comparative size of the valve/valve seat. As has been realized, an increased perimeter of this outlet area (or inlet area depending on the flow direction through the valve) as seen from the plunger, allows for a shorter stroke of the plunger with a preserved flow area between sealing edges 3 and 2 and the movable sealing surface 17 of the valve, in this example a flat surface of the plunger 16 provided with a sealing area 17. The inner path, here the inner path 5, and the outer path, here the surrounding outer paths 6, are connected to the inlet chamber 11 of the valve and thus have the same pressure. The outlet area of the recess 4 of the valve seat 1 is connected to the outlet and is separated from the inlet working medium when valve is closed.

To calculate the force needed to overcome the pressure differences [F=P*A] when opening, only the area of the outlet area is to be taken into consideration. The area of the inner path 5 does not contribute since it has the same pressure as the inlet chamber 11.

When calculating the perimeter of the outlet area, both the perimeter of the inner sealing edge 3 and the outer sealing edge 2 is to be included.

If the stroke length of the plunger shall not limit the flow of the working medium, it shall be chosen with regard to the perimeter of the outlet area in the valve seat to ensure that the areas for the working medium flow are matched and not limited by the stroke length. A general formula can be written as below:

Stroke length*nozzle perimeter≥nozzle area

Example: A comparison of stroke lengths for 25 mm² flow areas.

A valve seat with the opening area as depicted in FIGS. 1-5 compared to a conventional valve seat with an outlet with one circular perimeter.

Conventional valve seat: 25 mm² →⌀5.6 mm→perimeter 17.7 mm→min stroke length 1.4 mm Valve seat as depicted in FIGS. 1-5: 25 mm²→(chosen values) ⌀8 mm & ⌀5.6 mm→perimeter 42.7 mm→min stroke length 0.6 mm The inner edge 3 or outer edge 2 is not limited to any specific shapes or dimensions. By providing a valve seat where flow from one chamber of the valve to another chamber via an opening in the valve seat having both an inner and an outer perimeter, the total perimeter in the sealing area increases and provides for an improved flow in the valve seat at a comparative stroke length of a plunger of the valve.

In the embodiments described above it is assumed that it is the valve seat that is fixed and that the sealing is movable. However, it is also envisaged that the valve seat can be movable towards the sealing. In some embodiments both the valve seat and the sealing can be movable towards each other.

It is to be understood that the features from different embodiments can be combined and that no feature of an embodiment is essential unless explicitly so expressed. Hence, the person skilled in the art can select which features and dimensions that are deemed to be advantageous for a particular implementation. The valve and valve seat above are described in an implementation where the valve is an electromagnetic valve being generally cylindrically shaped and with a generally cylindrically shaped valve seat and designed to use air as working medium. The principles as set out herein are however applicable to other types of valves having other general shapes and also to valves using other types of working medium such as liquid working mediums. The valve can be designed to be normally closed and can also be designed to be normally open. The shape of the inner and outer sealing edge can have different forms such as oval or even rectangular.

The invention claimed is:

1. A valve seat for use in a valve, the valve seat comprising
    an inner path through a single body and adapted to be in fluid communication with a first chamber of the valve,
    at least one outer path also through the single body and adapted to be in fluid communication with the first chamber, and
    an intermediate path through the single body and that bounds an area configured to face a sealing area of the valve, said intermediate path being adapted to be in fluid communication with a second chamber, said area being bounded by an inner sealing edge and an outer sealing edge,
    wherein said valve seat is adapted to allow for a flow between said first chamber and said second chamber when the valve is in an open position, where said flow in said inner path and said at least one outer path flows through said area via the inner sealing edge and the outer sealing edge, respectively.

2. The valve seat according to claim 1, wherein the intermediate path comprises a recess in the single body, and a top section of the recess forms the area facing the sealing area of the valve.

3. The valve seat according to claim 1, wherein the inner sealing edge is round.

4. The valve seat according to claim 1, wherein the outer sealing edge is round.

5. The valve seat according to claim 1, wherein the inner sealing edge and the outer sealing edge are coplanar.

6. The valve seat according to claim 1, wherein the at least one outer path comprises at least two outer paths.

7. The valve seat according to claim 1, wherein the inner path is in fluid communication with the first chamber by way of at least two supply channels.

8. A valve comprising the valve seat according to claim 1.

9. The valve according to claim 8 wherein the valve is an electromagnetic valve.

10. The valve according to claim 8, wherein the intermediate path comprises a recess in the single body, and a top section of the recess forms the area facing the sealing area of the valve, and
    the valve comprises the sealing area, which is adapted to seal the recess when the valve is in a closed position.

11. The valve according to claim 8, wherein the valve is pneumatic.

* * * * *